United States Patent [19]
Herzog

[11] 3,905,177
[45] Sept. 16, 1975

[54] BOTTLE CAPPING MACHINE

[76] Inventor: Michael Herzog, 3615 Woolworth Bldg., Brooklyn, N.Y. 10007

[22] Filed: Oct. 29, 1973

[21] Appl. No.: 410,911

[52] U.S. Cl. ................. 53/314; 53/317; 53/331.5; 198/165
[51] Int. Cl.² .......................................... B67B 3/20
[58] Field of Search ............. 53/313, 314, 315, 317, 53/331.5; 198/165

[56] References Cited
UNITED STATES PATENTS

| | | | |
|---|---|---|---|
| 1,664,514 | 4/1928 | Kramer | 53/315 X |
| 2,408,447 | 10/1946 | Rau | 53/314 X |
| 2,732,991 | 1/1956 | De Bastos et al. | 53/314 |
| 2,734,672 | 2/1956 | Day et al. | 53/314 X |
| 2,942,394 | 6/1960 | Bjering et al. | 53/314 |
| 2,951,327 | 9/1960 | Fauth | 53/317 |
| 3,179,237 | 4/1965 | Ninneman | 198/165 |
| 3,280,534 | 10/1966 | Hildebrandt | 53/331.5 X |
| 3,477,202 | 11/1969 | Zetterberg | 53/315 |

*Primary Examiner*—Travis S. McGehee
*Assistant Examiner*—Horace M. Culver

[57] ABSTRACT

An improved machine for applying screw threaded caps upon bottles in a high speed, modern, mass production manner; the machine incorporating an inclined cap chute which at its upper end receives caps from a hopper and carries them in single file down to a gate at a lower end where filled bottles, passing below the gate, each peel off a cap as they pass by, the bottles then, moving on a conveyor belt, moving between two belts that move at a same rate of speed as the conveyor belt so to hold the bottle from rotating while at a same time the cap passes between two rows of oppositely rotating wheels that thus turn the cap so the screw thread it upon the bottle.

5 Claims, 13 Drawing Figures

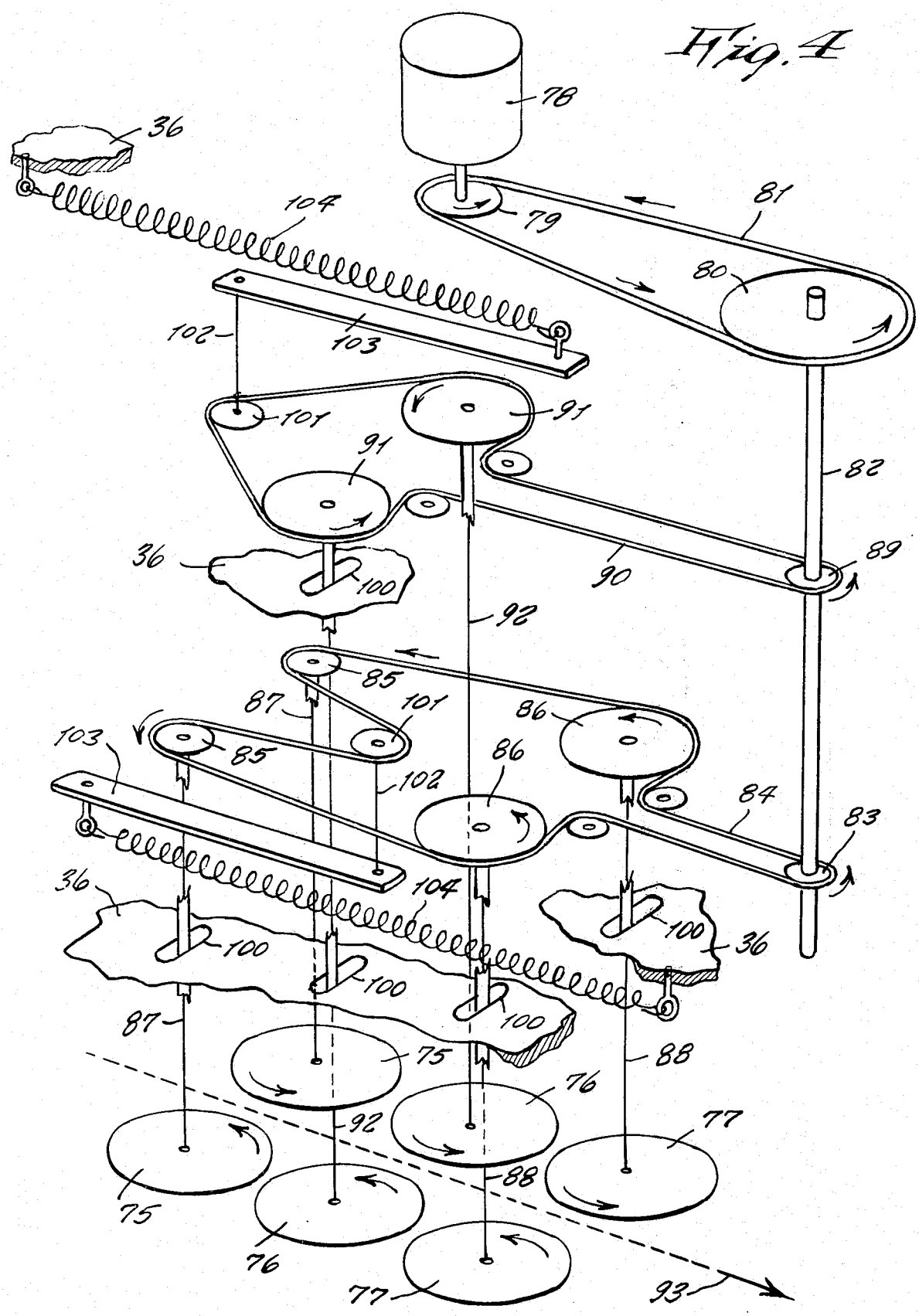

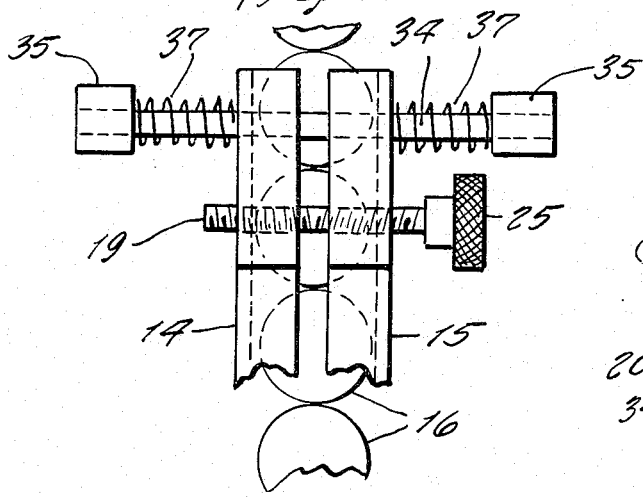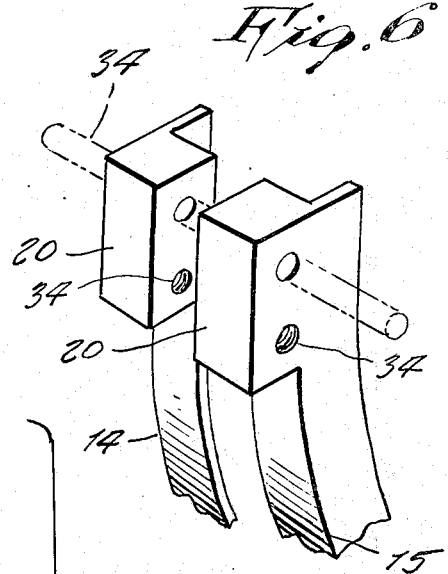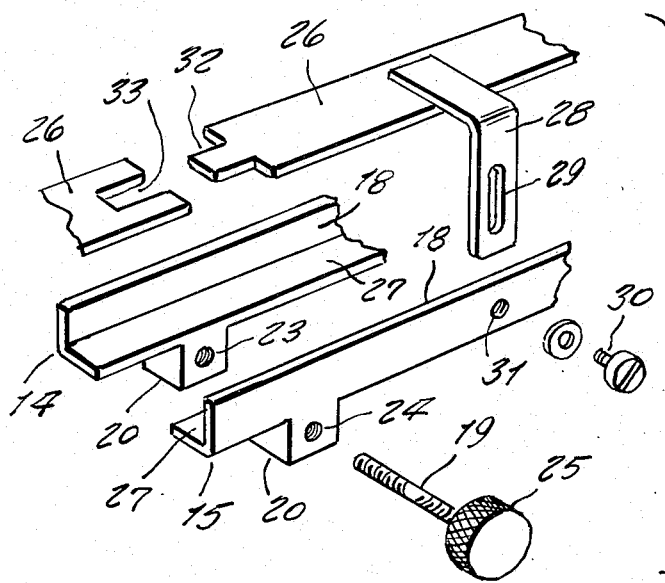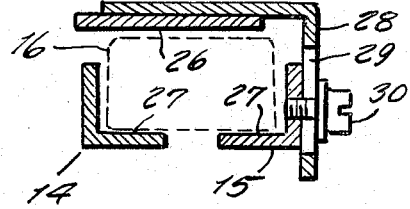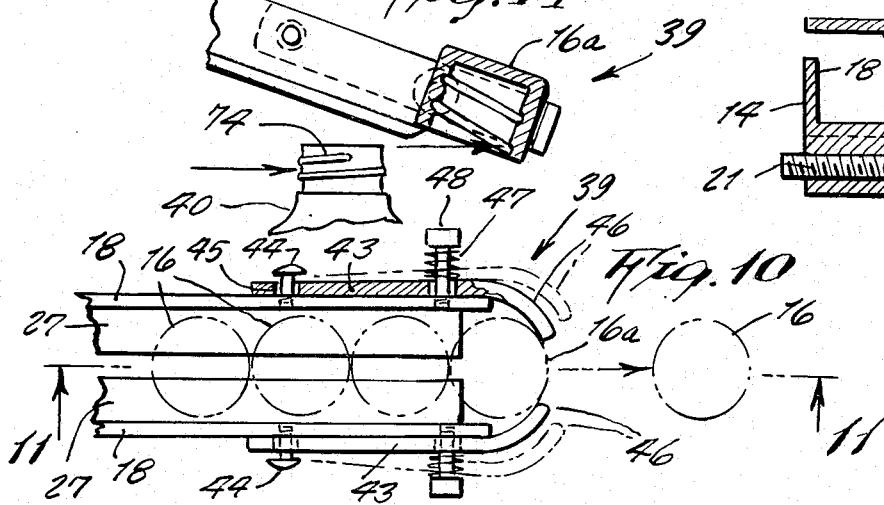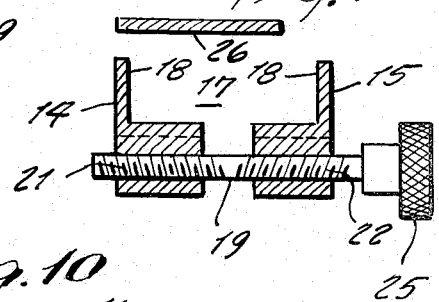

BOTTLE CAPPING MACHINE

This invention relates generally to bottling machinery. More specifically it relates to bottle capping machines.

A principal object of the present invention is to provide a bottle capping machine that applies screw threaded bottle caps upon bottles in a high speed production manner and which in actual use has proved to be advantageous over conventionally used bottle cap applying machinery.

Another object is to provide a bottle capping machine that includes a bottle cap chute that floats in order to vibrate and prevent the caps from interlocking or jamming while moving along the chute.

Another object is to provide a bottle capping machine in which the cap is rotated at different speeds during capping operation so that the entire capping operation is very fast along a high speed production line.

Yet another object is to provide a bottle capping machine which is readily adjustable for handling bottles that are of various shape as cylindrical, upwardly tapered or downwardly tapered.

Yet another object is to provide a bottle capping machine in which the cap chute is fully adjustable so to accommodate caps of various different diameters as well as heights, such caps being either plastic, metal or plastic tamper proof such as are required by FDA child protection purposes.

Other objects are to provide a bottle capping machine which is simple in design, inexpensive to manufacture, rugged in construction, easy to use and efficient in operation.

These and other objects will be readily evident upon a study of the following specification and the accompanying drawings wherein:

FIG. 4 is a diagram of the power drive.

FIG. 5 is an enlarged view in direction 5—5 of FIG. 1.

FIG. 6 is a detail of structure shown in FIG. 5.

FIG. 7 is an exploded view of the cap chute, shown fragmentarily.

FIG. 8 is a cross section on line 8—8 of FIG. 1.

FIG. 9 is a cross section on line 9—9 of FIG. 1.

FIG. 10 is a view in direction 10—10 of FIG. 1.

FIG. 11 is a view in direction 11—11 of FIG. 10.

FIG. 12 is a view of an upwardly tapered bottle which is capped when the machine is adjusted to the position shown in dotted lines in FIG. 1 so that, as shown in FIG. 12, the bottle grasping belts are inclined to suit the bottle shape.

FIG. 13 is a modified design of the invention shown adapted to cap bottles that are downwardly tapered or irregularly sidewardly bulged, the belt faces being made adjustable to accommodate any irregularity.

Figure 1:
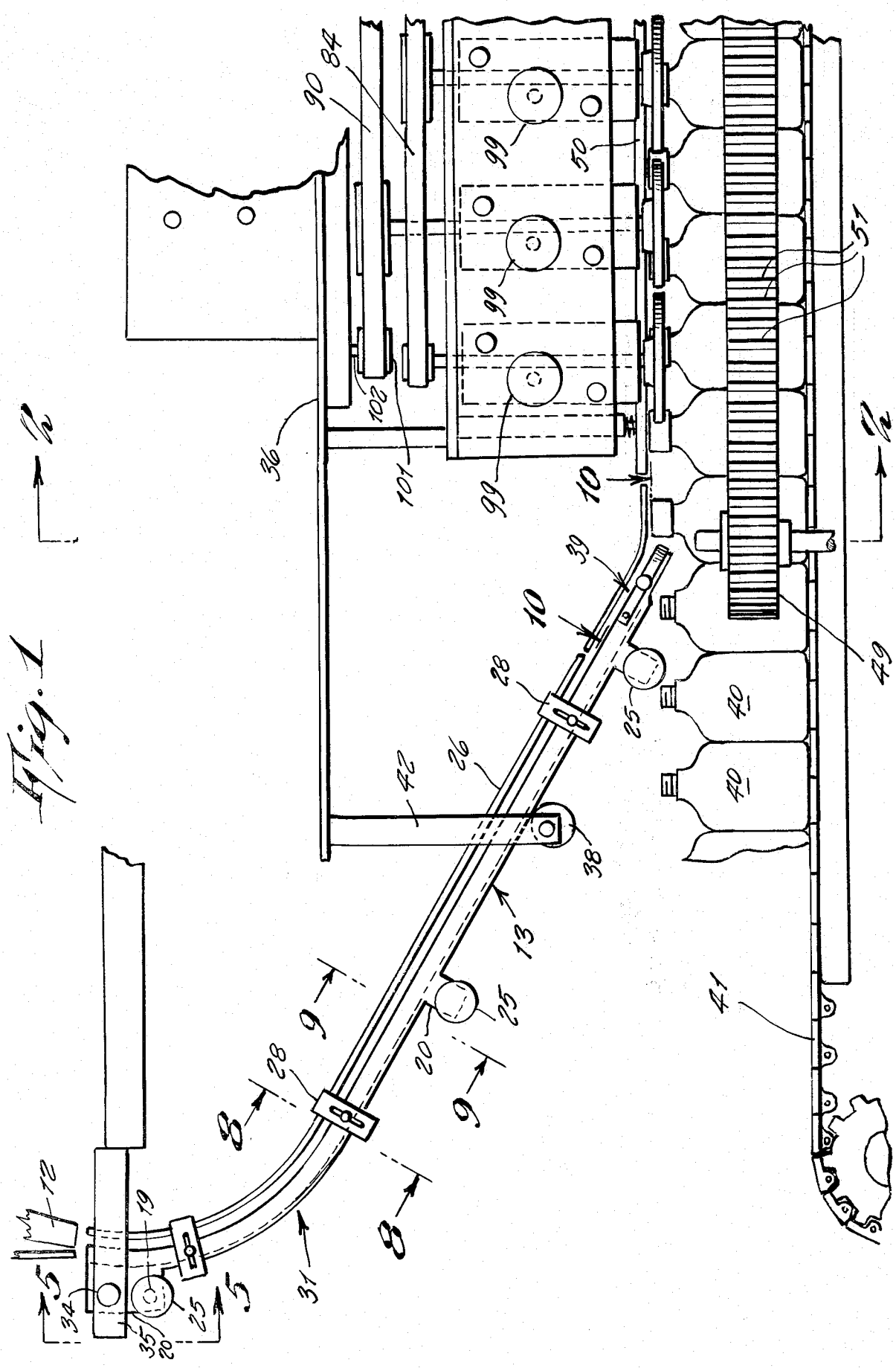
FIG. 1 is a side elevation view of the invention.

Referring now to the drawings in detail, the reference numeral 10 represents a bottle capping machine according to the present invention wherein there is shown a cap feed mechanism, a bottle grasping mechanism, and a cap tightening mechanism.

THE CAP FEED MECHANISM

A cap feed mechanism 11 extends between a hopper 12 and a cap-receiving end of the remainder of the machine, the mechanism 11 including an inclined trough shaped cap chute 13 consisting of a rear and front rails 14 and 15 of angle shape constructions and which are adjustable closer or further apart from each other, so to accommodate different diameters of bottle caps 16 traveling in the trough 17 and between sides 18 of the rails. This adjustment is made possible by means of transverse screws 19 each of which interconnects between pad 20 integral with the underside of each rail (as shown in FIGS. 7 and 9), each screw having left and right hand screw threads 21 and 22 at opposite ends for engaging correspondingly threaded opening 23 and 24 in the pads, whereby when the screw knurled head 25 is rotated, the rails are moved adjustably closer or further apart.

The chute also provides means to prevent the bottle caps from lifting up and falling out of the chute trough 17. This is accomplished by a top plate 26 that is adjustable in elevation so to accommodate caps of various different heights to fit between the underside of the top plate 26 and the sides 27 of the rails 14 and 15. This vertical adjustment of the top plate 26 is accomplished by supporting the plate from angle brackets 28 permanently affixed thereto, each bracket having a slot 29 for adjustably receiving a mounting crew 30 mounted in threaded opening 31 of one of the rails, Thus the trough 17 is fully adjustable in width and height for various dimensions of bottle caps. As shown in FIG. 7, the top plate may be made in longitudinal sections, the sections having tongues 32 and grooves 33 in their ends for interfitting with each other.

The upper ends of both rails 14 and 15 are pivotable about a pivot shaft 34 supported at its opposite ends in spaced apart stationary bars 35 rigidly secured to the machine frame 36. A compression coil spring 37 between each bar 35 and one of the rails are of equal strength and serve to centralize the upper end of the chute beneath the hopper, regardless of any rail width adjustments that may be made, so that at all times the caps from the hopper find the entry into the chute trough.

A lower portion of the chute is freely supported to rest upon an eccentric shaft 38 so that the chute freely floats thereupon in order to vibrate from the machine vibrations. This results in the caps moving along the chute to vibrate and float in the trough 17 so to prevent them to interlock and getting jammed.

The lower end of the chute has a gate 39 from which the caps are pulled out one at a time as filled bottles 40 traveling along a conveyor belt 41, move therebeneath. The elevation of the gate 39 is adjustable so that the caps are at a proper presentation level for the bottles to strip them from the gate, as shown in FIG. 11. This vertical adjustment is accomplished by rotation of the eccentric shaft so the lower portion of the chute (to which the gate is secured) can be raised or lowered, thus causing the chute to pivot about the pivot shaft 34. The eccentric roller is supported on a bracket 42 stationarily secured to the machine frame 36.

The gate 39, shown in FIG. 10, consists of two bars 43 positioned adjacent the outer sides of the rail side walls 18 and are each attached loosely thereto by means of a single, over-long, headed screw 44 secured to side wall 18 and which extends through a large diameter hole 45 in bar 43, so that the bar is free to swing sidewardly away from the side wall 18 as shown by the dotted lines. The hole 45 is near one end of each bar while opposite ends of the bars extend beyond the lower ends of the rails, the extending ends each being inwardly turned toward each other so to form jaws 46. A compression coil spring 47 around another screw 48 secured to side wall 18 bears against the outer side of each bar 43 so to normally keep the jaws in a closed position, as shown by solid lines in FIG. 10, the jaws thus serving as a stop against which the lowermost bottle cap 16a in the chute rests.

However, as shown in FIG. 11, the chute and gate are inclined, as stated earlier, so that the lowermost cap 16a is also inclined. It is to be noted, as shown in FIG. 11, that all the caps are positioned in the chute so that their threaded opening is on their bottom side when arriving at the jaws. Thus due to the inclined position of lowermost cap 16a, when a bottle 40 moves horizontally therebelow, and a leading edge of the cap being lower than the upper edge of the bottle thus results in the bottle pulling the cap out of the gate by spreading apart the jaws momentarily so that the bottle now advances ahead with the cap sitting thereupon. The gate then immediately closes therebehind so that the next cap now moves into position against the jaws for a next cap dispensing cycle.

THE BOTTLE GRASPING MECHANISM

Figure 2:
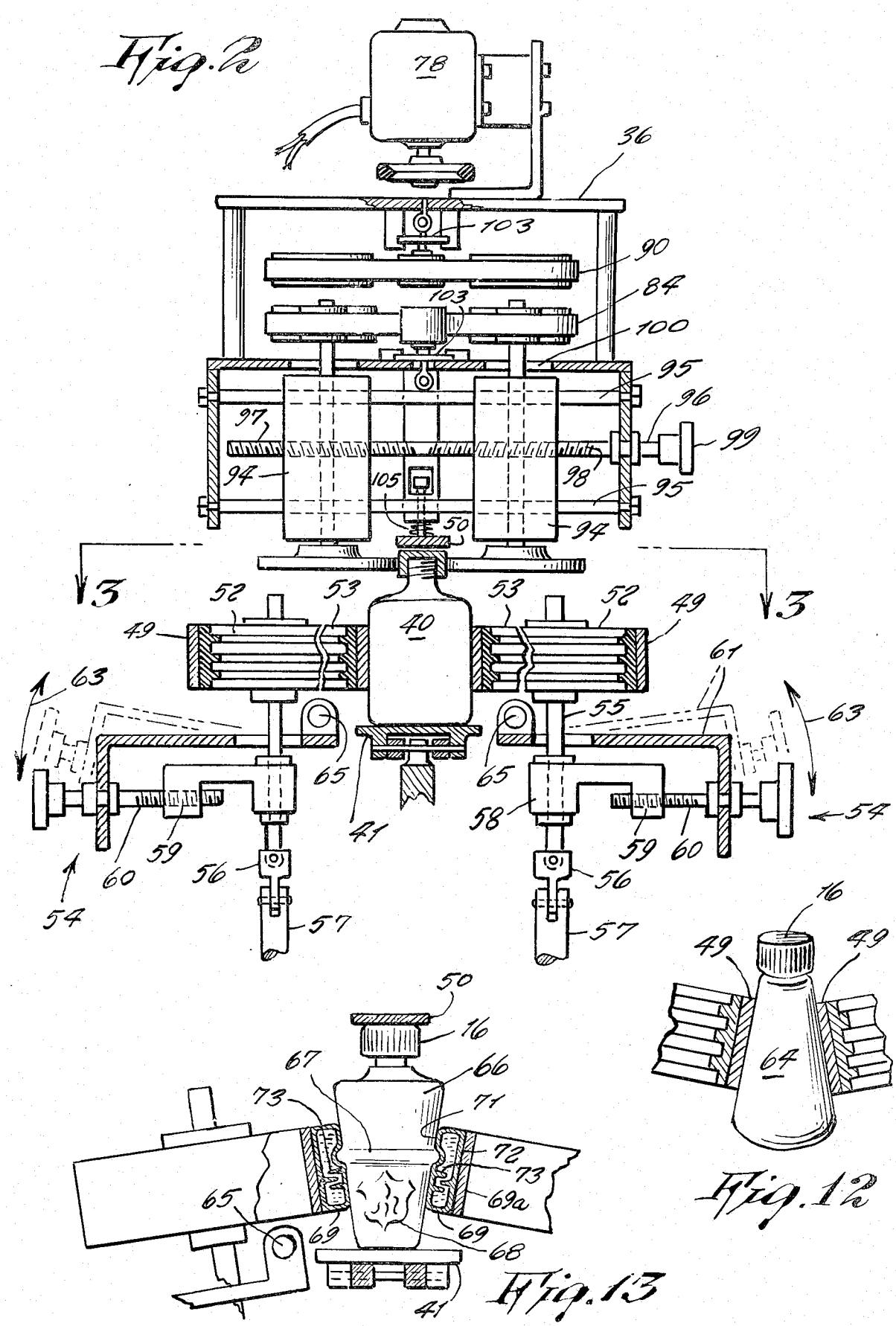
FIG. 2 is a cross sectional end view of the invention as viewed in direction 2—2 of FIG. 1.
Figure 3:
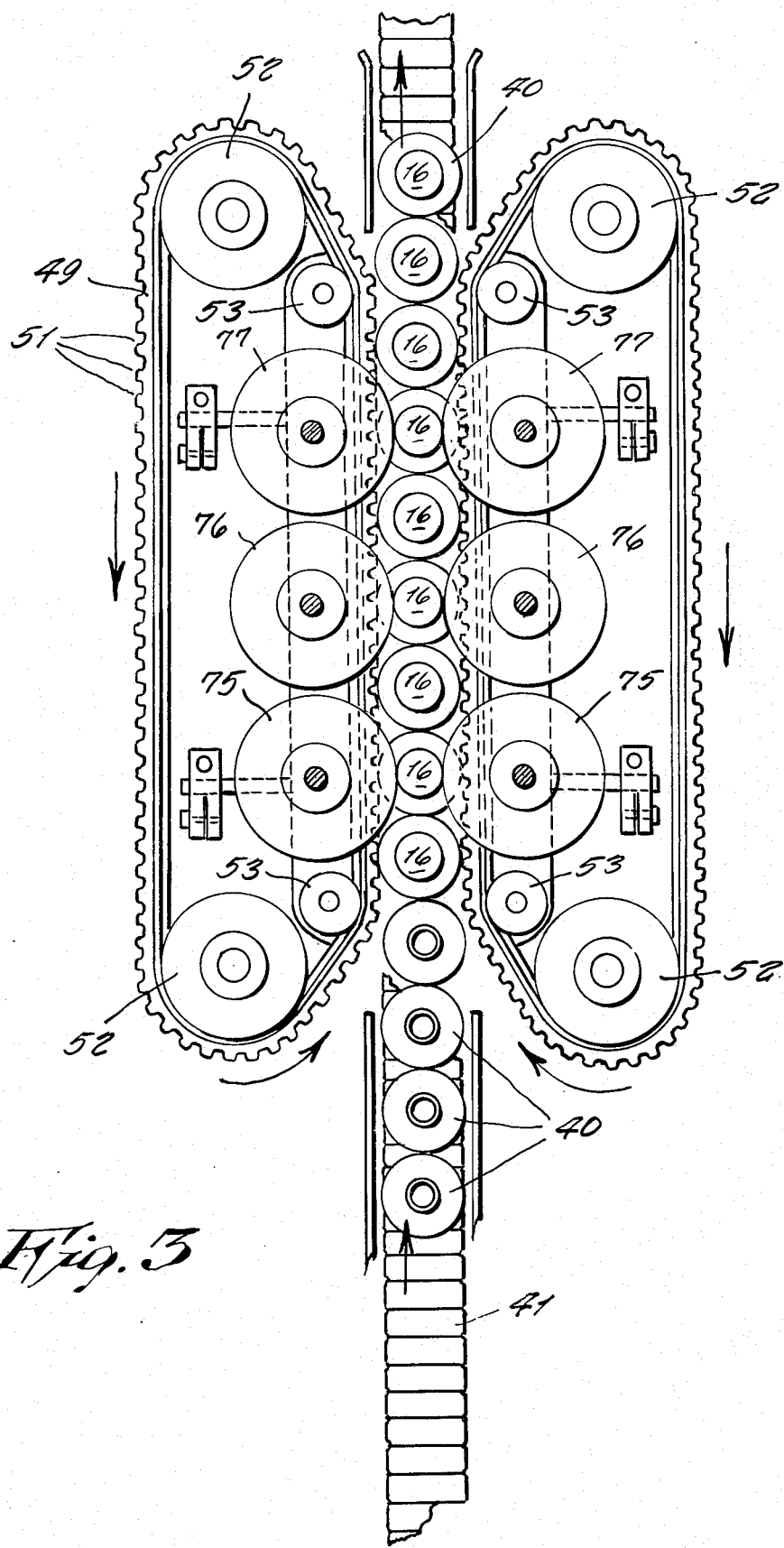
FIG. 3 is a cross sectional view in direction 3—3 of FIG. 2.

Almost immediately after the cap 16 is upon the bottle 40, the bottle is grasped between two endless bottle grasping belts 49 and the cap arrives below a cap stabilizer 50 that prevents the cap from accidentally falling off. This structure is best illustrated in FIGS. 1, 2 and 3.

The grasping belts 49 have external teeth 51 in order to firmly hold against opposite sides of the bottle and prevent it from rotating. Accordingly, as the bottles advance at a specific speed along the conveyor belt 41, then the grasping belts must likewise move at the same speed. Each of the endless grasping belts moves around a pair of drive rollers 52 and a pair of adjustable pressure rollers 53, which are powered by a motor (not shown) within a lower part of the machine.

Each one of the bottle grasping belts 49, its two drive rollers 52 and pressure rollers 53 can be made as a unit or assembly 54 by being carried on a single base that can be moved forward or rearward so to accommodate different sizes of bottles, or which can be tilted as a unit so to accommodate bottles that are conical instead of cylindrical.

Each drive roller 52 is affixed on a drive shaft 55 which at its lower end is secured by means of a universal joint 56 to a power shaft 57 driven by the motor, not shown. The drive shaft is supported in a bearing block 58, which has a threaded opening 59 receiving screw 60 that is supported rotatably free in a housing 61 of the machine. The purpose of the screw 60 is to allow moving the shaft 55, within the transverse slots 62 of the housing, so that belts 49 can be brought either closer together or further apart in order to accommodate bottles of different diameters therebetween.

Additionally, as shown by the dotted lines in FIG. 2, each of the housings 61 that support the unit 54 are tiltable as indicated by arrow 63 in order that the grasping belts are inclined so to grasp bottles 64 that are conically upwardly tapered, as shown in FIG. 12. The housings 61 are pivotable about shafts 65 stationarily mounted on the machine frame 36.

It is to be noted that due to foreward-rearward movement of the units 54, and additionally due to the adjustable inclination thereof together with the housing 61, the power shafts 57 may necessarily be splined in order to allow such full adjustability.

In a modified design of the invention illustrated in FIG. 13, the machine is made adaptable to handle the capping of bottles 66 that are upwardly tapered, which may have annular extending diameter portion 67 or which have any sideward bulging portion such as a three dimensional design emblem 68.

In this form of the invention, the housings 61 are able to incline in an opposite direction to that shown by dotted lines in FIG. 2, and each grasping belt 69 is tubular hollow and may or may not be filled with a liquid. The relatively thin vertical walls 71 and 72 of the belt each have horizontal flanges 73 protruding into the interior of the belt, the flanges being in alternate relation as shown. The purpose of these flanges is to prevent the vertical wall 71 (that is adjacent the bottle) from sliding downwardly along the bottle surface due to the bottle downward taper, as the bottle travels. The vertical wall 72 is understood to be rigidly affixed to the backing member 69a of the belt.

The hollow interior of the belt allows easier deformation of the belt so to accommodate bottle surface irregularities such as the distended annular ring 67 and protruding design 68.

THE CAP TIGHTENING MECHANISM

The cap tightening mechanism includes two rows of three rotating wheels in each row; the caps, loosely placed upon the bottles being moved between the two rows so that the rotating wheels cause the caps to turn and thus screw upon each threaded bottle neck 74.

As shown in FIG. 4, the six wheels are arranged in three pairs. The cap advances first between a first pair of wheels 75, then between a second pair of wheels 76 and finally between a pair of wheels 77.

All of the wheels are powered, as shown in FIG. 4, by an overhead electric motor 78 which through pulleys 79 and 80 and endless belt 81 drive a mainshaft 82. A pulley 83 on the mainshaft drives endless belt 84 passed around a pair of small pulleys 85 and a pair of large pulleys 86. Pulleys 85 are mounted on shafts 87 to which the first pair of wheels 75 are also secured, while pulleys 86 are mounted on shafts 88 to which the third pair of wheels 77 are also secured. Accordingly, when the motor is operating, the first pair of wheels 75 rotate faster than the wheels 77 due to the smaller diameter pully 85. Thus the bottle cap is rotated quicker when passing between one of the pairs of wheels than when passing between the others.

Another pulley 89 also mounted on the mainshaft drives endless belt 90 passed around a pair of pulleys 91 which are mounted on shafts 92 to which the second pair of wheels 76 are also secured.

It is to be noted that all the wheels rotate in a counter clock wise direction so that caps moving along the arrow line 93 are screwed on the bottle neck.

In order that the machine may be used to apply different diameter caps, the pairs of wheels are adjustable so to be closer together or further apart. This is accomplished by shafts 87, 88 and 92 being supported rotatably free in bearing blocks 94 which are forewardly-rearwardly adjustable by means of each pair of the blocks associated with one pair of the wheels being slidable upon a pair of horizontal bars 95 stationarily secured at their ends on the machine frame 36. A single screw 96 extending through each pair of blocks is provided with a left hand screw thread 97 engaging a rear block and a right hand thread 98 engaging the front block whereby when a manually operated knob 99 on the front of the machine is turned, the blocks slide on the bars either toward each other or away so that the wheels thus can accommodate different diameter bottle caps. Due to the foreward-rearward adjustment movements of the shafts 87, 88 and 92, the machine frame includes slots 100 so to clear the shafts, as shown in FIGS. 2 and 4.

Additionally due to this foreward-rearward adjustment of the shafts, each of the endless belts 84 and 90 must be automatically adjusted for tension due to foreward-rearward movement of the pulleys 85, 86 and 91. This is accomplished in both instances by an idler or take up pulley 101 engaging belts 84 or 90 is on a shaft 102 supported on bar 103 that is slidable on the machine frame 36 against the action of a tension coil spring attached at one end to the bar 103 and anchored at its other end to the machine frame 36, as shown in FIG. 4.

The cap tightening mechanism also includes the stabilizer bar 50, mentioned earlier and bears with slight pressure downwardly against the upper side of the caps during the cap screwing operation. This is accomplished by light springs 105 between the upper side of the stabilizer bar and the machine frame as shown in FIG. 2.

BRIEF SUMMARY OF OPERATION

Caps 16 are fed from the hopper into the inclined chute 31 with the cap threaded openings all facing one way. At a same time, bottles 40 are advanced on a conveyor belt 41 through the machine. The cap at the lowermost end of the chute is pulled out of the chute gate 39 by each passing bottle; by the cap lip hooking over the bottle upper edge. The bottle with the cap thus loosely placed thereupon is then advanced so that it is grasped between two grasping belts so to prevent the bottles from rotating while advancing along the conveyor belt. At a same time the cap is moved below a stabilizer bar that holds the cap squarely on the bottle and also at a same time the cap moves between two rows of rotating wheels that thus turn the cap so as to screw engage it on the bottle. Thus capped, the bottle leaves the machine.

While various changes may be made in the detail construction it is understood that such changes will be within the spirit and scope of the present invention as is defined by the appended claims.

What is claimed is as follows:

1. A bottle capping machine comprising a cap feeding mechanism, a bottle conveying belt, a bottle grasping mechanism and a cap tightening mechanism, wherein said conveying belt and mechanisms are synchronized to effect sequentially placement of a cap on each bottle as the belt moves in one direction, followed by simultaneous grasping of the bottle by the grasping mechanism and tightening of the cap by the tightening mechanism, said cap feeding mechanism comprising an inclined cap chute having upper and lower end aligned with the bottles and feeding a cap onto the top of each bottle in successive order, said chute comprising a pair of laterally spaced members secured together with transversly adjustable means whereby the width of the chute may be adjusted for different cap sizes, said chute being pivoted at said upper end and secured adjacent said lower end by a cam rotatable about an off-center axis transverse to said chute, whereby rotation of said cam will vary the elevation of said chute to accommodate bottles of varying heights, wherein said chute includes an adjustable holder at its lower end for feeding caps to the tops of the bottles, said bottle grasping mechanism comprising a pair of parallel endless belts disposed on opposite sides of the bottle including rollers engaging said belts, pressing said belts into grasping contact with said bottles preventing rotation of said bottles, said rollers being secured to spaced shafts, wherein said cap tightening mechanism comprises pairs of parallel shafts having tightening wheels mounted thereon in contact with the bottle caps on the bottles including means for rotating the shaft with the wheels mounted thereon, whereby the wheels rotate in the same direction causing tightening of the bottle caps, said shafts with the wheels mounted thereon being rotatably mounted in adjustable blocks including means for moving the blocks towards and away from each other, thereby adjusting the space between the said wheels whereby the said spaced shafts having said rollers mounted thereon engaging said belts are mounted on bearings adjustable in a direction transverse to the movement of the conveyor belt, said bearings being mounted on plates pivotable about an axis parallel to the conveyor belt movement whereby said bearings and rollers may be adjusted transversely toward and away from each other and also inclined relative to each other by pivoting the said plates about said axis parallel to the conveyor belt movement.

2. A bottle capping machine as in claim 1 wherein the means for rotating the shaft with the wheels thereon includes a belt and pulley drive with automatic means for varying the tension in the pulleys responsive to the spacing of said blocks.

3. A bottle capping machine as in claim 2 wherein the means for spacing the blocks and the accompanying shafts comprises a transverse screw mounted threadedly through said blocks and rotatably on a fixed portion of said machine having an external manually adjustable handle.

4. A bottle capping machine as in claim 3, wherein the means for automatically adjusting the pulley tension comprises an idler pulley mounted on a laterally movable shaft, said shaft being secured to a movable plate bias by a spring to cause the idler pulley to increase tension in the belt.

5. A bottle capping machine as in claim 4, wherein the endless belts include deformable portions adapted to grasp the bottles securely at varying degrees of inclination.

* * * * *